Patented Aug. 17, 1954

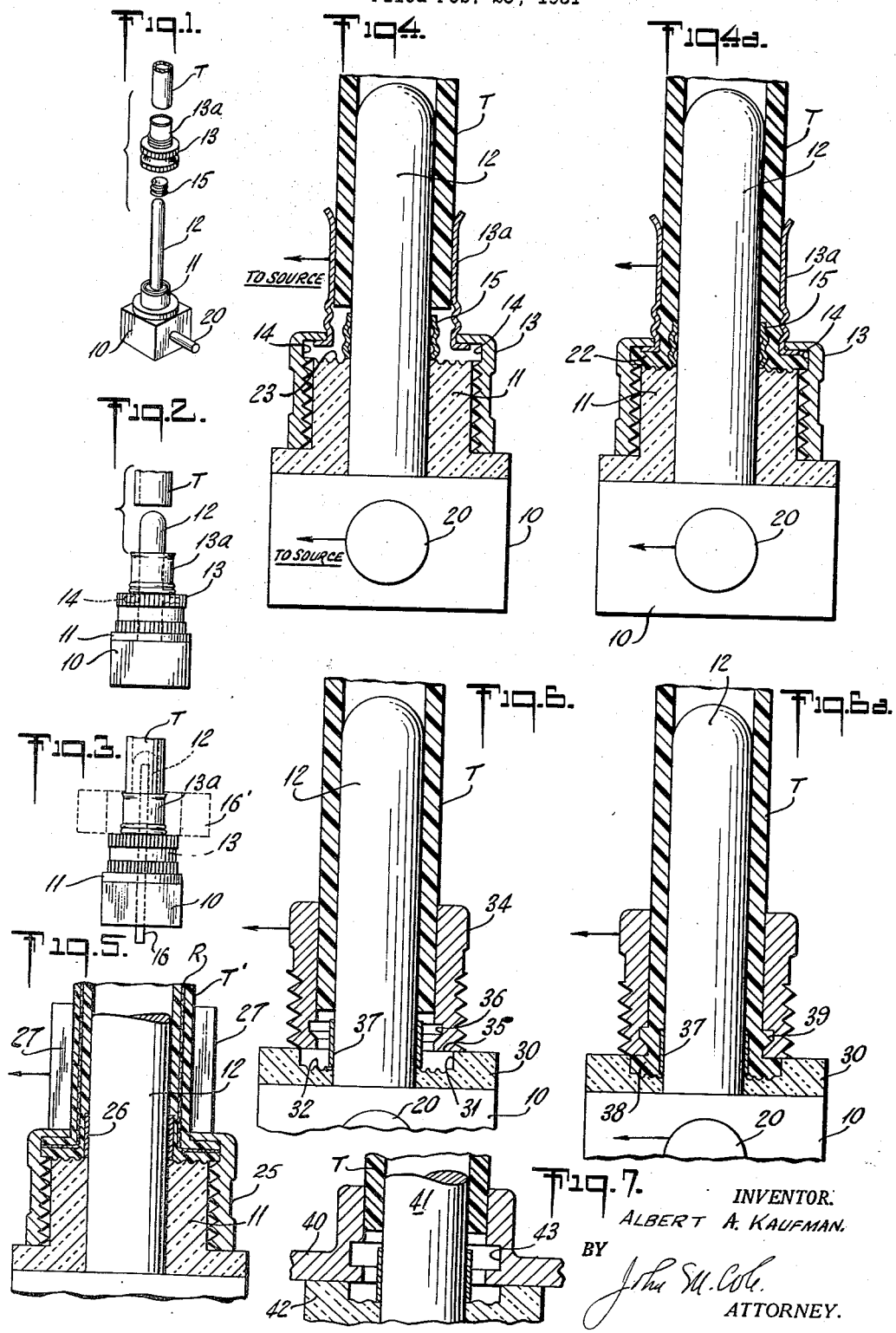

2,686,337

UNITED STATES PATENT OFFICE 2,686,337

METHOD FOR JOINING HOSE TO TUBULAR COUPLING MEMBERS

Albert A. Kaufman, North Plainfield, N. J., assignor to Industrial Synthetic Corporation, Garwood, N. J., a corporation of New Jersey Application February 23, 1951, Serial No. 212,230

6 Claims. (Cl. 18—59)

The present invention relates to a method for joining hose to tubular coupling members.

In many arts, for example, the art of manufacturing plastic garden hose, it is necessary to provide couplings at the end of the hose so that a length of hose may be connected to another length or to a hose bib, nozzle or other fitting. In the industrial arts it is also desirable to connect hose and non-metallic tubing to coupling members of various types so that the hose or tubing may be connected to suitable fittings. Heretofore it has been customary in joining hose and non-metallic tubing to couplings to employ mechanical means, such as clamps, pressure plates, rings, etc., for joining the two parts together.

The present invention contemplates the joining together of hose and tubing made of heat softenable material and suitable coupling elements in a novel manner according to which the coupling element and a stationary fixture form the mold into which the heat softenable material of the hose, when in softened condition, is forced. The new construction avoids the permanent stresses and strains which tend to cause leakage of conventional couplings after long use.

According to the present invention the heat softenable hose material is caused to flow into the mold spaces provided by the coupling and the fixture and to assume a new form and shape in which it is securely united to the coupling so that the coupling is no longer readily separable from the hose. All this is accomplished by a reforming of the heat softenable material.

The present invention may be carried out with hose or tubing made of various forms of heat softenable material such as plasticized vinyl chloride, acrylonitrile, or natural or synthetic rubber. While the coupling members are ordinarily metal, coupling members made of other material unaffected by the heating may be employed. The coupling members may have an annular configuration which allows them to be revolvable about the hose or tubing, or a non-circular one which prevents relative turning.

The invention is particularly well adapted for use in the manufacture of garden hose using the vinyl chloride tubing and employing metal hose couplings adapted to fit conventional fittings, nozzles and the like. As heretofore made the metal couplings for such hose have resembled the couplings used with conventional rubber hose, and have required more metal than needed to provide the threaded parts. When such garden hose is fitted with the new couplings in the manner to be described herein it is possible to secure a product functioning in the conventional manner in the hands of the user, but employing less metal than the conventional types of construction. Furthermore, the cost of manufacture and assembly is less than the cost of manufacture where the conventional mechanical methods of securing hose to coupling are employed.

The accompanying drawings illustrate several manners in which the present invention may be carried out and different forms of fixture which may be employed in these processes.

In these drawings:

Figure 1 is an exploded perspective view illustrating a fixture adapted for high frequency heating of the hose, together with the hose, a hose coupling nut and a reinforcing ring;

Figure 2 illustrates a similar fixture adapted for use with the coupling nut, the hose being externally preheated before being inserted in place;

Figure 3 is a view similar to Figure 2 showing an arrangement according to which the hose is first inserted and then heated extraneously;

Figures 4 and 4a are enlarged sectional view through the fixture, the internally threaded hose coupling and hose, the parts being arranged for high frequency heating of the hose, Figure 4 showing the hose in a preliminary position for dielectric heating and Figure 4a showing it pushed to the final position;

Figure 5 is a view similar to Figure 4 illustrating the joining of a laminated, reinforced hose with a different form of coupling and employing a split electrode;

Figures 6 and 6a are views similar to Figures 4 and 4a illustrating the joining of the hose with an externally threaded hose coupling; and Figure 7 illustrates a method of securing the tubing to a coupling flange.

The fixture shown in Figures 1 to 4a inclusive and the method described in connection therewith relates to the joining of tubular, heat softenable material to tubular coupling members of the internally threaded type such as used in hose couplings. Here the fixture has a base 10, a cylindrical abutment or anvil 11 and a mandrel 12. The mandrel is preferably vertical and is of the proper size to pass inside the tubing or hose T to be used and the abutment or anvil 11 is of the proper size to receive a coupling member such as the nut 13 and the nut has an inner annular recess 14 located, as shown in Figure 4, above the top of the abutment 11. The outside diameter of the abutment member 11 is such as to closely fit inside the threaded coupling member 13 and may or may not be threaded. The coupling nut 13 as shown in Figures 1, 2, 4 and 4a revolvably carries a sheet metal skirt 13a of a diameter to receive the outside of the tube T. In addition to the coupling member each joint may employ a rigid bushing 15 (usually metal) of a size to fit about the mandrel 12.

The materials from which the fixture is to be constructed will depend upon the type of heating which is to be employed in the process. Where only a small number of joints are to be made, and one desires to avoid the expense of fixtures suitable for quantity production, the base, abutment and mandrel may be made of inexpensive material non-adherent to the heat softenable material, or made non-adherent by lubricants and of the proper dimensions and capable of retaining form when in use. Very simple apparatus, such as indicated in Figure 2, may be used when the tubing T is externally heated to a softening temperature, for example, by immersion into heated liquid oil or water. Where such a process is to be carried out the bushing 15 is dropped down to the mandrel and rests against the top of the abutment. The coupling is dropped down to the mandrel and rests on the flanged portion of the member 11 (as shown in Figure 4). The dimensions of the parts are such that not only is there an annular space between the mandrel 12 and the tubular portion 13a of the nut, and a flange-like annular region above the top of the anvil or abutment 11 which extends out into an undercut 14, in the nut 13.

When the bushing and nut are in place on the fixture as shown in Figure 2 and the end of the tubing T has been preheated to the softening temperature, it is possible to push the tubing down over the mandrel and bring the softened end against the anvil and then by continuing the pressure longitudinally of the tubing cause the softened material to flow out and fill the voids. In some cases it may be necessary to hold the nut down so that it is not lifted by the plastic material. The securement of the tubing to the nut is quickly accomplished.

Where it is desired to secure the heat from an external source, such as a flame or a resistance heater, the same sort of a fixture may be employed and heated, for example, by one or two resistance heaters, either inside the mandrel or outside as indicated at 16, 16' in Figure 3. The use of extraneous heat, however, is a slow operation because of the necessity of dissipating the heat of the fixture before the material sets.

The preferred process, where large quantities of like assemblies are to be made, involves the use of dielectric or high frequency heating. In this case the mandrel 12 is insulated from the fixture and is connected to a terminal diagrammatically illustrated at 20, adapted for connection with one side of a high frequency source. The abutment or anvil member 11 is made of insulating material which will be unaffected by the heat and which will not adhere to the heat softened material. A ceramic abutment is suitable. When this type of operation is to be carried out the fittings 13, 13a are placed on the end of the hose and properly positioned by a jig so that the hose enters the desired amount. They may fit snugly enough to avoid slippage. The bushing 15 is placed on the mandrel. The metal hose connections and hose are then passed down onto the mandrel to bring them to substantially the position shown in Figure 4 in which it will be seen that the lower end of the hose is above the top of the bushing 14 and the top of the anvil or abutment 11 is substantially even with the lower wall of a circumferential recess 14 in the nut member 13. This leaves below the end of the tube T an annular space of L-shape cross-section.

The other side of the high frequency current source is connected to the skirt portion 13a and high frequency current flows through the dielectric to the hose, thereby heating the dielectric quickly to the softening temperature. When the hose is pushed toward the fixture this softened material flows into the unheated mold cavities and fills the voids so that the ring 14 is sealed in and the softened material fills all the space including the circumferential undercut 14. The hose material is thereby re-formed to shape so that it now has an integral flange 22, Figure 4a, which enters the undercut 14 in the nut 13. As soon as the current is turned off, dielectric heating ends and the joint quickly cools so that the coupling is permanently secured at the end of the hose. The bushing member 15 is also imbedded in the tube so that it is retained in position. This ring makes it impossible to exert on the tube a tensile force sufficiently strong to collapse the flange. The ring 15 may be omitted, particularly where there is no likelihood of subjecting the hose to a pull sufficient to collapse the flange and disengage the hose from the fitting.

In order that the face of the flange thus formed may have annular, easily compressible ridges, the abutment 11 is preferably provided with annular grooves indicated at 23.

When the circumferential recess 14 is annular, the nut is revolvable on the hose flange 22. The skirt portion 13a may be tight or loose with respect to the nut. The hose does not adhere to this skirt portion so that it is readily possible to revolve the nut on the end of the hose when coupling or uncoupling is desired. The skirt 13a requires very little metal, provides an external electrode and on the finished product conceals any back flash.

In Figure 5 the nut shown at 25 is similar to the one shown at 13 in Figure 4, but it does not have a skirt such as shown at 13a. Instead of using a corrugated reinforcing ring 15, Figure 5 illustrates the use of a smooth walled ring 26. In Figure 5 the hose T', instead of being solid is shown in Figures 4 and 4a in the form of two ply hose which has the usual spiral wound or knitted or braided reinforcement R. Such hose may be secured to couplings in the same manner as the solid hose. In Figure 5 a supplementary electrode 27 is shown to take the place of skirt 13a. This supplementary electrode is split so that it can be readily inserted in place and removed.

Figures 1 through 5 above discussed in detail relate to the joining of the hose to the internally threaded hose coupling. Figures 6 and 6a illustrate a slightly modified form of fixture suitable for use when joining the hose to the externally threaded or male coupling member. Here, the anvil or abutment element 30 is provided with an annular recess 31 having ridges 32 similar to the ridges 23. This abutment member is adapted to support the externally threaded coupling member 34 with its lower end 35 spaced above the bottom of the recess 31. The member 34 is provided with a circumferential undercut 36 near its outer or lower end. A bushing or ring 37, either of the smooth or ribbed type, is placed on the mandrel 12. This assemblage provides an L-shaped space including the undercut recess 36. The hose T may be heated in any of the manners above referred to and when heat softened may be shifted in the position in Figure 6 to the position shown in Figure 6a. This operation similarly forms flange 38 integral of the body of the tube T. The flange is beyond the end of the coupling member 34 and a portion of the deformed material enters the undercut as indicated at 39. The coupling member 34 is therefore securely held on the hose so that it cannot move in either direction. It can, however, revolve if desired, as heated material shrinks away from non-heated abutment member upon cooling.

The internally threaded coupling shown in Figures 1 through 5 may be employed to secure the hose to any suitable form of externally threaded coupling in common use. The exposed face of the flange 22 forms a gasket or packing cooperable with a conventional, externally threaded, pipe fitting. The externally threaded type of construction illustrated in Figure 6a is suitable for use as the male or plug member with internally threaded fittings, hose nozzles and the like and when so used the exposed flange 38 forms a gasket or washer to assure a tight connection. Ordinarily a hose may be fitted at one end with the male and the other end with a female fitting, and the hoses can therefore be connected together, or to other forms of hose, pipe couplings, nozzles and the like.

Figure 7 illustrates the manufacture of couplings wherein the tubing T is secured to a flanged member 40. The mandrel 41 may be the same as above described. The abutment member 42 resembles the abutment member 30. The coupling member 40 has an annular undercut 43 similar to the undercut 14 in the nut 13. When the heat softened tubing is forced into the mold formed by the mandrel abutment and coupling parts, the flange or plate coupling 40 is securely fastened to the hose.

It will be noted that the coupling devices employed do not restrict or change the inside diameter of the hose or tubing and that a smooth, substantially continuous inner wall is present so that flow of liquid is not impeded. While for many purposes metal reinforcement rings may be employed, there may be conditions in chemical plants where such metal rings must be avoided. In such case the reinforcing ring may be made of suitable material which is compatible with the liquid or gas.

These constructions are discussed more in detail in my application for patent for Combined Hose and Hose Couplings, filed concurrently herewith Serial No. 212,231, February 23, 1951.

Since it is obvious that the invention may be embodied in other forms and constructions within the scope of the claims, I wish it to be understood that the particular form shown is but one of these forms, and various modifications and changes being possible, I do not otherwise limit myself in any way with respect thereto.

What is claimed is:
1. The method of joining a hose made of heat softenable material to a tubular coupling member, or the like, of a size slightly larger than the outside diameter of the hose and having an inner, undercut, circumferential recess, which comprises placing the tubular member about a fixture including a mandrel over which the hose is adapted to pass and an abutment adapted to form together with the recess in the tubular member and the mandrel a circumferential chamber of greater maximum diameter than the hose, and forcing the hose while heat softened in the direction of its length to effect flow thereof into the circumferential chamber and form an integral flange which enters the undercut recess, and after the same has cooled to solidify the hose, removing from the fixture the flanged hose and tubular member joined to it.

2. The method of claim 1, wherein a loose ring placed about the mandrel adjacent the abutment in advance of the hose is embedded in the inner wall of the hose to reinforce it against collapse.

3. The method of claim 1, wherein the hose is preheated before it is placed in the mandrel.

4. The method of claim 1, wherein the hose is heated by extraneous heat after being placed on the mandrel.

5. The method of claim 1, wherein the heating of the hose is effected by high frequency current passed through the wall of the hose to the mandrel which acts as an inner electrode.

6. The method of joining a hose made of thermoplastic material to a tubular coupling member, or the like, of a size slightly larger than the outside diameter of the hose and having an inner undercut, circumferential recess, which comprises placing the tubular member about a fixture including a mandrel over which the hose is adapted to pass and an abutment adapted to form together with the recess in the tubular member and the mandrel a circumferential chamber of greater maximum diameter than the hose, and forcing the hose while heat softened in the direction of its length to effect flow thereof into the circumferential chamber and form an integral flange which enters the undercut recess, and after the same has cooled to solidify the hose, removing from the fixture the flanged hose and tubular member joined to it.

References Cited in the file of this patent
UNITED STATES PATENTS

| Number | Name | Date |
| --- | --- | --- |
| 1,589,177 | Kendall | June 15, 1926 |
| 1,702,957 | Bard | Feb. 19, 1929 |
| 1,757,994 | Emmerich | May 13, 1930 |
| 1,813,425 | Rosaire | July 7, 1931 |
| 2,041,518 | Salz | May 19, 1936 |
| 2,059,867 | Hinds | Nov. 3, 1936 |
| 2,257,355 | Vohrer | Sept. 30, 1941 |
| 2,363,508 | Doster | Nov. 28, 1944 |